(12) United States Patent
Lalibertéet al.

(10) Patent No.: US 6,505,870 B1
(45) Date of Patent: Jan. 14, 2003

(54) ACTUATION SYSTEM FOR HIGHLY UNDERACTUATED GRIPPING MECHANISM

(75) Inventors: Thierry Laliberté, Loretteville (CA); Clément Gosselin, Charlesbourg (CA)

(73) Assignee: Université Laval, Ste-Foy (CA)

( * ) Notice: Subject to any disclaimer, the term of this patent is extended or adjusted under 35 U.S.C. 154(b) by 53 days.

(21) Appl. No.: 09/579,493

(22) Filed: May 30, 2000

(51) Int. Cl.$^7$ ................................................ B66C 1/00
(52) U.S. Cl. ......................................... 294/106; 901/31
(58) Field of Search ................................. 294/106, 111, 294/115, 907, 88; 901/31–36, 39, 46; 414/618

(56) References Cited

U.S. PATENT DOCUMENTS

| | | |
|---|---|---|
| 3,694,021 A | 9/1972 | Mullen |
| 3,866,966 A | 2/1975 | Skinner, II |
| 3,901,547 A | 8/1975 | Skinner, II |
| 3,927,424 A | 12/1975 | Itoh |
| 4,351,553 A * | 9/1982 | Rovetta et al. |
| 4,364,593 A * | 12/1982 | Maeda |
| 4,377,305 A | 3/1983 | Horvath |
| 4,623,183 A * | 11/1986 | Aomori |
| 4,834,443 A | 5/1989 | Crowder et al. |
| 4,921,293 A * | 5/1990 | Ruoff et al. |

(List continued on next page.)

OTHER PUBLICATIONS

Hiroshi Shimojima et al., A Study of Grippers with Multiple Degrees of Mobility, JSME International Journal, 1987, vol. 30, No. 261:515–522.

Richard M. Crowder, An anthropomorphic robotic end effector, Robotic and Autonomous Systems, 7 (1991):253–268.

Gongliang Guo et al., A single–DOF multi–function prosthetic hand mechanism with an automatically variable speed transmission, Robotics, Spatial Mechanisms, and Mechanical Systems, ASME 1992, DE–vol. 45:149–454.

Miodrag Rakic, Multifingered robot hand with selfadaptabilty, Robotics & Computer–Integrated Manufacturing, 1989, vol. 5, No. 2/3, pp. 269–276.

Jill D. Crisman et al., Graspar: A Flexible, Easily Controllable Robotic Hand, IEEE Robotics & Automation Magazine, Jun. 1996, pp. 32–38.

Thierry Laliberté et al.,Simulation and design of underactuated mechanical hands, Mech. Mach. Theory, 1998, vol. 33, No. 1/2, pp. 39–57.

*Primary Examiner*—Victor Batson
(74) *Attorney, Agent, or Firm*—Ogilvy Renault; James Anglehart

(57) ABSTRACT

This invention provides an actuation system for a highly underactuated gripping mechanism with ten degrees of freedom, which requires only two actuators, one for actuating the opening and closing of three fingers and the other for the orientation of two rotatable fingers with synchronization. Underactuation between the fingers is provided by a one-input/three-output differential which is associated with an orientation mechanism so that an orientation-fixed finger is deactivated when the two orientatable fingers are rotated to face each other for a pinch grasp. Each finger is enabled to be self-locked in its closing and opening action when the power is off. This feature is important, especially for the fingers actuated by a differential mechanism for the underactuation between the fingers. In one embodiment of the invention, planetary gearing system is used for the differential. In another embodiments, a Geneva mechanism is used for the orientation transmission, and a fastening interface using an indexing ring is provided to connect an external driving apparatus. A fluid power system is also described in another embodiment of the invention, in which the gripping mechanism is actuated by fluid power and the implementation of the underactuation among the fingers is performed by fluid power.

41 Claims, 11 Drawing Sheets

U.S. PATENT DOCUMENTS

| | | |
|---|---|---|
| 4,980,626 A | 12/1990 | Hess et al. |
| 4,984,951 A | 1/1991 | Jameson |
| 4,986,723 A | 1/1991 | Maeda |
| 5,062,673 A * | 11/1991 | Mimura |
| 5,080,681 A | 1/1992 | Erb |
| 5,108,140 A | 4/1992 | Bartholet |
| 5,200,679 A | 4/1993 | Graham |
| 5,280,981 A | 1/1994 | Schulz |
| 5,328,224 A * | 7/1994 | Jacobsen et al. |
| 5,378,033 A | 1/1995 | Guo et al. |
| 5,501,498 A * | 3/1996 | Ulrich |
| 5,762,390 A | 6/1998 | Gosselin et al. |
| 6,244,644 B1 * | 6/2001 | Lovchick et al. |

* cited by examiner

US 6,505,870 B1

ACTUATION SYSTEM FOR HIGHLY UNDERACTUATED GRIPPING MECHANISM

TECHNICAL FIELD

The present invention relates to a gripping mechanism for use in robotic application and, more particularly, to an actuation system for actuating an underactuated gripping mechanism in which the number of actuators required is smaller than the number of degrees of freedom of the gripping mechanism.

BACKGROUND OF THE INVENTION

Many different types and forms of gripping mechanisms are known, providing a variety of functions and uses. Some gripping mechanisms are designed for specific tasks, they are simple, robust, easy to manufacture and lead to simple control schemes. However, they are not flexible and a new gripping mechanism must be designed for each given task. These gripping mechanisms have only a few degrees of freedom and are widely used in industry. Other gripping mechanisms are more flexible and can perform several different tasks. However, they are difficult to manufacture, lead to complex control schemes, include several actuators and can provide only small gripping forces. These gripping mechanisms have several degrees of freedom.

Finally, other gripping mechanisms have an architecture which combines the latter two cases, taking advantage of both through the concept of underactuation. Their design is based on a large number of degrees of freedom but with a reduced number of actuators. Indeed, underactuated gripping mechanisms are defined as those which have fewer actuators than the degree of freedom. This leads to flexible gripping mechanisms without the complexity associated with a large number of actuators.

Underactuation can be achieved using different structural mechanisms. A typical example is described in the Applicants' U.S. Pat. No. 5,762,390, issued on Jun. 9, 1998. A mechanical gripper, described in this patent, has three fingers and three phalanges per finger. The three pivotable phalanges are actuated by one actuator in a flexible and versatile gripping action of three degrees of freedom. The fingers are robust and can provide large gripping forces and perform power grasps and pinch grasps. An additional mechanism is provided to maintain the last phalanx orthogonal to the palm in order to allow the gripper to perform pinch grasps on objects of different sizes. The mechanical gripper including the limited number of actuators permits the fingers to bend independently so that, by actuating some of the actuators and not actuating others, different co-operative bending relationship are achieved.

In addition to the underactuation between the phalanges of a finger, it is also possible to obtain underactuation between the fingers of a gripping mechanism. This will further decrease the number of actuators while maintaining the same number of degree of freedom. This principle has been disclosed for the actuation of many fingers, for example, in U.S. Pat. No. 5,378,033 to Guo et al. and in the literature, see, for example, the article by G. Guo, X. Qian and W. A. Gruver, "A SINGLE-DOF MULTI-FUNCTION PROSTHETIC HAND MECHANISM WITH AN AUTOMATICALLY VARIABLE SPEED TRANSMISSION", published in the proceeding of the ASME mechanism conference, Phoenix, Vol. DE-45, pp. 149–154, 1992, and the article by M. Rakik entitled "MULTI-FINGERED ROBOT HAND WITH SELF-ADAPTABILITY", published in Robotics and Computer-Integrated Manufacturing, Vol. 5, No. 2–3, pp. 269–276, 1989. In these references, each of the fingers has only one degree of freedom, i.e., the motion of the phalanges is coupled. The combination of the underactuation of the phalanges of a finger and the fingers of a hand is disclosed in the Applicant's United States Patent. The underactuation between the fingers is performed with the help of a one-input/multi-output differential. The concept of this differential has been introduced in the Applicant's United States Patent using a lever for two outputs.

It is also possible to orient the fingers with respect to one another (i.e., motion about an axis perpendicular to the palm of the gripping mechanism) with only one actuator by coupling their orientation. This is possible through the use of four-bar mechanisms that connect the base of the fingers. This decreases the number of degrees of the actuation and freedom of the system. This type of coupling has already been suggested in the Applicant's United States Patent and is provided by gears in U.S. Pat. No. 3,901,547 to Skinner II, and by grooves in the Guo et al. patent.

In order to achieve this underactuation between the fingers in a a differential gripping mechanism, the force of the actuator is to be distributed between the fingers. If a finger grasps an object, the actuator will continue its motion and the other fingers will continue to close with the help of the differential mechanism. Nevertheless, this principle associated with a differential mechanism sometimes limits the performance of the gripping mechanism especially in pinch grasps. It may be desirable, for example, to use only two fingers to perform a pinch grasp and prevent the remainder of the fingers from closing which may potentially disturb the grasp. This is not a problem with a gripping mechanism having multiple actuators because each finger is controllably actuated independently.

Therefore, there exists a need for improved gripping mechanisms which are underactuated between fingers using differential mechanisms and adapted to deactivate predetermined fingers in a closing action when it is desired.

It is also desirable to self-lock the fingers when a gripping mechanism grasps an object. It is especially important when a differential mechanism is used for underactuation between the fingers. An external force acting on one of the fingers may cause displacement not only of the finger receiving the force but also of the remainder of the fingers because all the fingers are associated with the differential mechanism. A lever differential mechanism as described in the prior art is not able to provide the finger self-locking function. Therefore, there exists a need for an actuation system for gripping mechanisms underactuated between fingers, which provides a finger self-locking function.

SUMMARY OF THE INVENTION

It is an object of the present invention to provide an actuation system for a gripping mechanism underactuated between a plurality of fingers, using a differential mechanism which is adapted to deactivate predetermined fingers in close/open actions when desired, while actuating the remainder of the fingers in the action.

It is another object of the present invention to provide an actuation system for a gripping mechanism underactuated between a plurality of fingers, using a differential mechanism which is adapted to provide a finger self-locking function in close/open actions.

In one particular embodiment, it is an object of the invention to provide an actuator system for a self-adaptive gripping mechanism with at least ten degrees of freedom which requires two actuations with respect to two co-ordinates that are the force or position of the closing of the fingers and orientation of the fingers, the two co-ordinate being related to improve the performance of the gripping mechanism.

It is a further object of the present invention to provide an actuation system for an underactuated gripping mechanism, which includes an orienting mechanism to rotate the fingers and allows self-locking of the fingers in predetermined orientations and allows, to a certain extent, for more imprecise actuation input for orientation when the fingers are locked in the predetermined orientations.

In general terms, an actuation system for a gripping mechanism underactuated between fingers thereof is provided with a differential mechanism and an orienting mechanism to actuate the fingers in close/open actions and orientation actions respectively, the differential mechanism being adapted to deactivate predetermined fingers in an close/open action when desired.

In more particular terms, an actuation system is provided for a gripping mechanism underactuated between a plurality of fingers at least two of which are rotatable for orientation, each finger having a finger actuation mechanism to actuate the finger in a selective gripping action. The actuation system comprises a differential mechanism operatively connected to the respective finger actuation mechanisms for receiving one power input and transmitting the one power input into a plurality of power outputs to actuate the respective fingers in a close/open action, the differential mechanism including a stop mechanism to deactivate at least a third one of the fingers in the close/open action when desired; an orienting mechanism operatively connected to the rotatable fingers for receiving one rotation input and transmitting the one input into at least two rotation outputs to rotate the respective at least two rotatable fingers in finger orientation.

The number of the plurality of fingers is preferably three, although four or more fingers may be desirable. In the case of four fingers, all fingers may rotate to choose between a radial movement grasp and an opposed finger grasp for cylindrical objects or the like. Preferably, the fingers have at least two or three articulated phalanges and are underactuated.

The stop mechanism is preferably associated with the orienting mechanism so as to stop a close/open action of the third one of the fingers when the two rotatable fingers are oriented to face each other. The differential mechanism is preferably adapted to self-lock the fingers in the close/open action when power for actuating the closing and opening of the fingers is off. The two rotatable fingers are preferably self-locked in predetermined orientations when an orienting motion is not desired.

More especially, in accordance with one embodiment of the invention, an actuation system for actuating a ten-degree of freedom gripping mechanism which includes a palm plane and three underactuated fingers, as described in the Applicant's U.S. Pat. No. 5,762,390 which is incorporated herein by reference. In addition to the underactuation in the fingers, underactuation between the fingers is performed with the help of a one-input/three-output differential, which comprises two planetary gear trains. The first planetary gear train has a carrier as input and sun gear and an internal gear as outputs. The second planetary gear train has the internal gear of the first planetary gear train as input and a sun gear and an internal gear as outputs. Therefore, the three general outputs are the sun gear of the first planetary gear train, the sun gear of the second planetary gear train and the internal gear of the second planetary gear train. In order to obtain proper distribution of the power, the three outputs should have the same or close to the same output torque. It can be achieved by appropriate ratios of the number of teeth. Three general output gears of the differential mechanism are of equal size and transmit their power to the gears on three screw shafts which are inputs of three transmission screws. The usefulness of the differential is that if one of the fingers is blocked by the object, the other fingers are not blocked and continue to move. Therefore, the finger applies force on the object only when all the fingers have properly made contact with the object.

The three outputs of the differential mechanism are transmitted to the fingers through the transmission screws. Each screw shaft is rotated by the gear on the screw shafts. A linear motion is transmitted to an actuation nut which is threadedly connected to the screw shaft. The rotation of the actuation nut is stopped by a guiding bar, or a driving bar. The driving bar is connected between the actuation nut and the finger actuation mechanism to actuate the closing and opening of the finger.

The closing and opening of the finger is self-locked because the power transmitted from rotation to translation through the transmission screw is not reversible and, therefore, an external force acting on one finger is not able to be transmitted through the differential mechanism to affect the balanced position of the three fingers.

The orientation of two rotatable fingers are rotated with synchronization from one input with the help of a gearing mechanism. A finger gear is attached to each of a rotating basis of the two rotatable fingers. An input gear attached on an orientation shaft directly drives one of the finger gears. A free gear, attached on a free shaft, is driven by the input gear and transmits its motion to the other finger gear. This arrangement allows the respective two finger bases to rotate in opposite directions. Each of the rotatable fingers is able to rotate 90 degrees, from the two fingers facing the third finger which is an orientation fixed finger, to the two fingers facing each other.

The actuation of the gripping mechanism is performed by two actuators. For the opening and closing of the fingers, a first actuator drives the input of the one-input/three-output differential. For the orientation of the fingers, a second actuator drives the orientation shaft.

In one orientation where the two rotatable fingers face each other, the third finger is not used for the grasp and could even potentially disturb the grasp. Therefore, it is stopped in its open position by a mechanism which is added to the orientation shaft. This mechanism comprises a rack attached to the orientation shaft that engages with the output gear of the differential mechanism associated with the orientation-Fixed finger only for the specific configuration in which the two rotatable fingers face each other.

A passive gripping mechanism according to another embodiment of the invention, does not have the two actuators as in the first embodiment, and is driven by a specific external driving apparatus. This apparatus drives the gripping mechanism by a socket that can rotate and advance. The opening/closing of the fingers an the orientation of the fingers are both performed by a socket torque applied by the external driving apparatus. The switching of the power of the socket torque between the two outputs is performed by the socket advance with the help of an indexing mechanism which is part of the passive gripping mechanism. The indexing mechanism works as follows. Each time the socket advance releases and pushes on the indexing mechanism, the travel ends alternate between two different positions. This is possible because of an indexing ring. Depending on the advance of the input shaft, the power is transmitted via a socket to the opening/closing input or to the orientation input. The sockets and male connector are machined for easy alignment.

The orientation of the rotatable fingers is self-locked to predetermine orientations. In order to obtain predetermined self-locked orientations, the orientation shaft is driven via a Geneva mechanism. When the Geneva mechanism is in a moving phase, a pin of a driver is in one of four slots of the Geneva wheel. During this phase, the driver moves the Geneva wheel 90 degrees. When the Geneva mechanism in the dwell phase, the Geneva wheel is locked by a locking disk of the driver. This mechanism allows self-locking of the rotatable fingers, even if they are not driven. It allows for positioning impression of the driver and it also allows free motion of the driver during the dwell phase, which will be proven useful for a switching mechanism.

In a third embodiment of the invention, the gripping mechanism is actuated by fluid power which may be either hydraulic or pneumatic. The fingers are the same is in the other embodiments. The underactuation between the fingers is performed by a fluid power system instead of the gearing system. The fluid power is partitioned in three outputs, which emulates the one-input/three-output differential. Each of these outputs powers one of the three piston cylinders that drive the three fingers. The self-locking feature of the transmission screws is replaced by controllable check valves which ensure that the fingers will not go back unless the power to open the fingers is activated. To orient the fingers, a rotational fluid actuator activates the orientation shaft. As an alternative to a mechanical blocking mechanism, a solenoid valve may be connected to one piston cylinder which is associated with the orientation fixed-finger to stop the fluid supply to the piston cylinder to deactivate the opening and closing of the finger. The solenoid valve may be controlled by a switch connected to the orientation shaft so that the solenoid valve is activated to shut off the fluid supply only when the two rotatable fingers are oriented to face each other.

The actuation system according to the present invention provides a practical approach to establish a link between the differential mechanism for actuating the closing and opening of the fingers and the orienting mechanism for rotating the fingers so that the performance of the gripping mechanism underactuated between the fingers thereof is significantly improved, especially in pinch grasps. The advantages of the actuation system also includes the self-locking of each finger when the power is off, which is important to the gripping mechanism underactuated between the fingers. Other features and advantages will be more apparent with reference to the details of the preferred embodiments to be described below.

According to another aspect of the invention, there is provided a gripping mechanism comprising at least three fingers, at least two of which are rotatably counted for orientation on a palm, an actuation mechanism causing each of the finger to open and close, a differential mechanism operatively connected to the respective finger actuation mechanisms for receiving a grasp power input and transmitting the one power input into a plurality of power outputs to actuate the respective fingers in a close/open action, an orienting mechanism operatively connected to the respective rotatable fingers for receiving one orientation input and transmitting the one input into at least two rotation outputs to rotate the respective at least two rotatable fingers in a finger orientation, a two-degree of freedom power input having two degrees of freedom for receiving mechanical actuation power external to the gripping mechanism, and a switching mechanism selectively connecting the two-degree of freedom power input to the grasp power input of the differential mechanism or to the orientation input of the orienting mechanism in response to movement of the two-degree of freedom power input in one of the two degrees of freedom.

Preferably, the two-degree of freedom power input comprises rotation and translation, the power grasp input being derived from the rotation. The two-degree of freedom power input may be a single power shaft input, and the switching mechanism comprises an axially displaceable connector mounted to the power shaft input for rotating therewith, an indexing mechanism connected to the power shaft input and axially movable sequentially between a neutral position, a grasp power input position, a neutral position and an orientation position, wherein the axially displaceable connector engages the grasp power input of the differential mechanism or the orientation input of the orienting mechanism in response to movement of the axial translation of the two-degree of freedom power input. While the fingers have preferably to least three degrees of freedom and the actuation mechanism differentially drives each degree of freedom of the finger, it is possible to provide fewer or more degrees of freedom to the fingers.

BRIEF DESCRIPTION OF THE DRAWINGS

Figure 1:
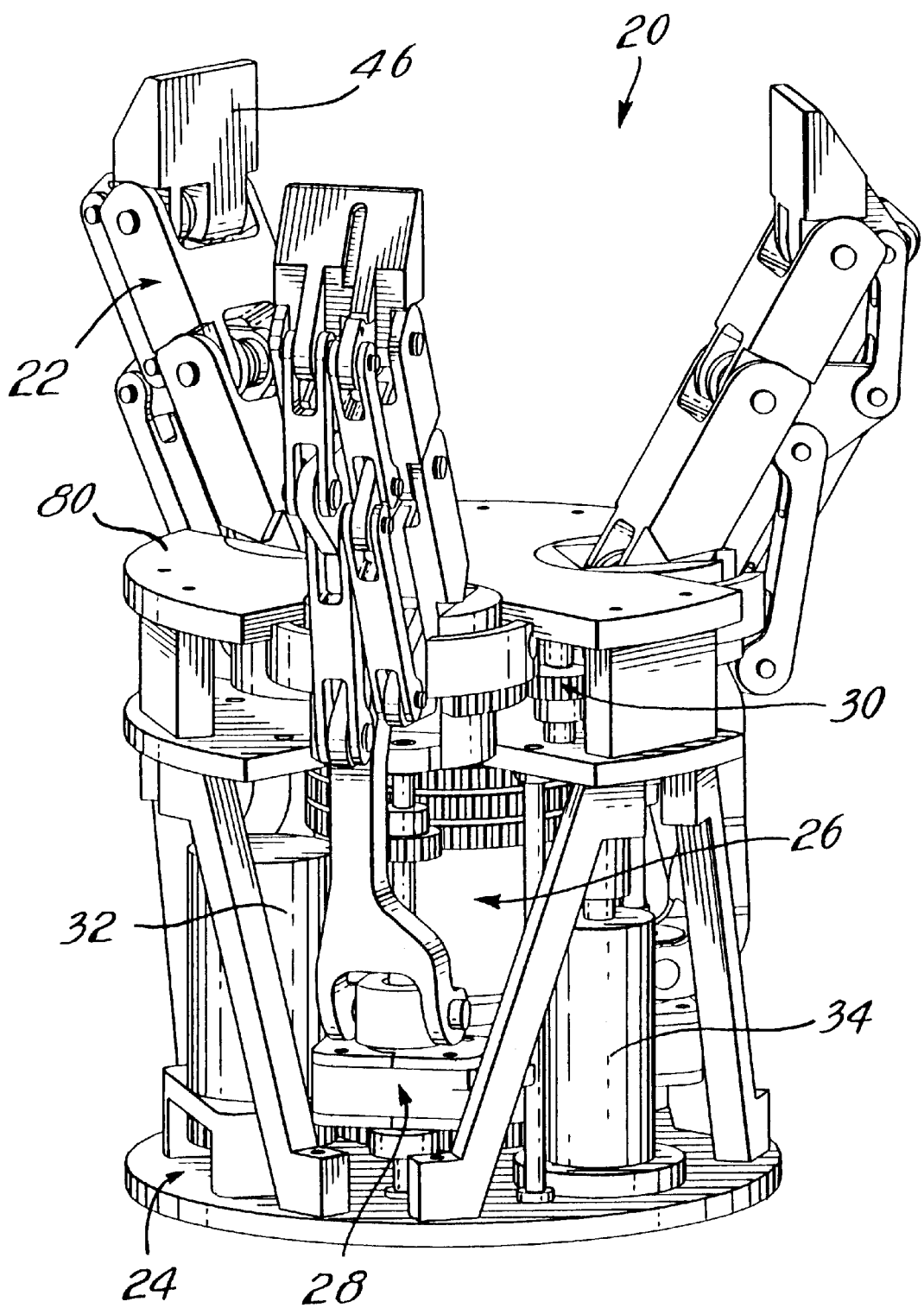
Figure 2:
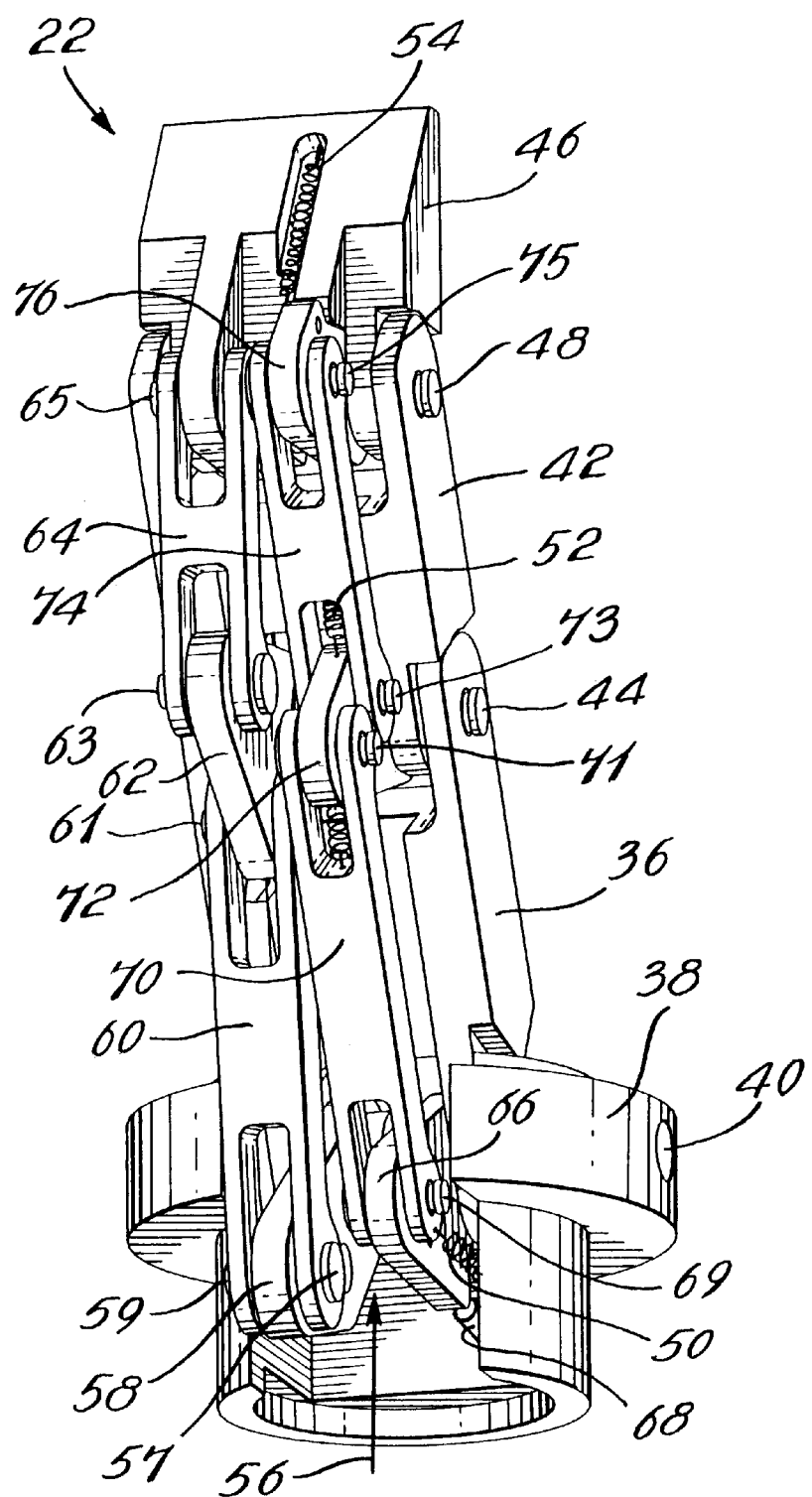
Figure 3:
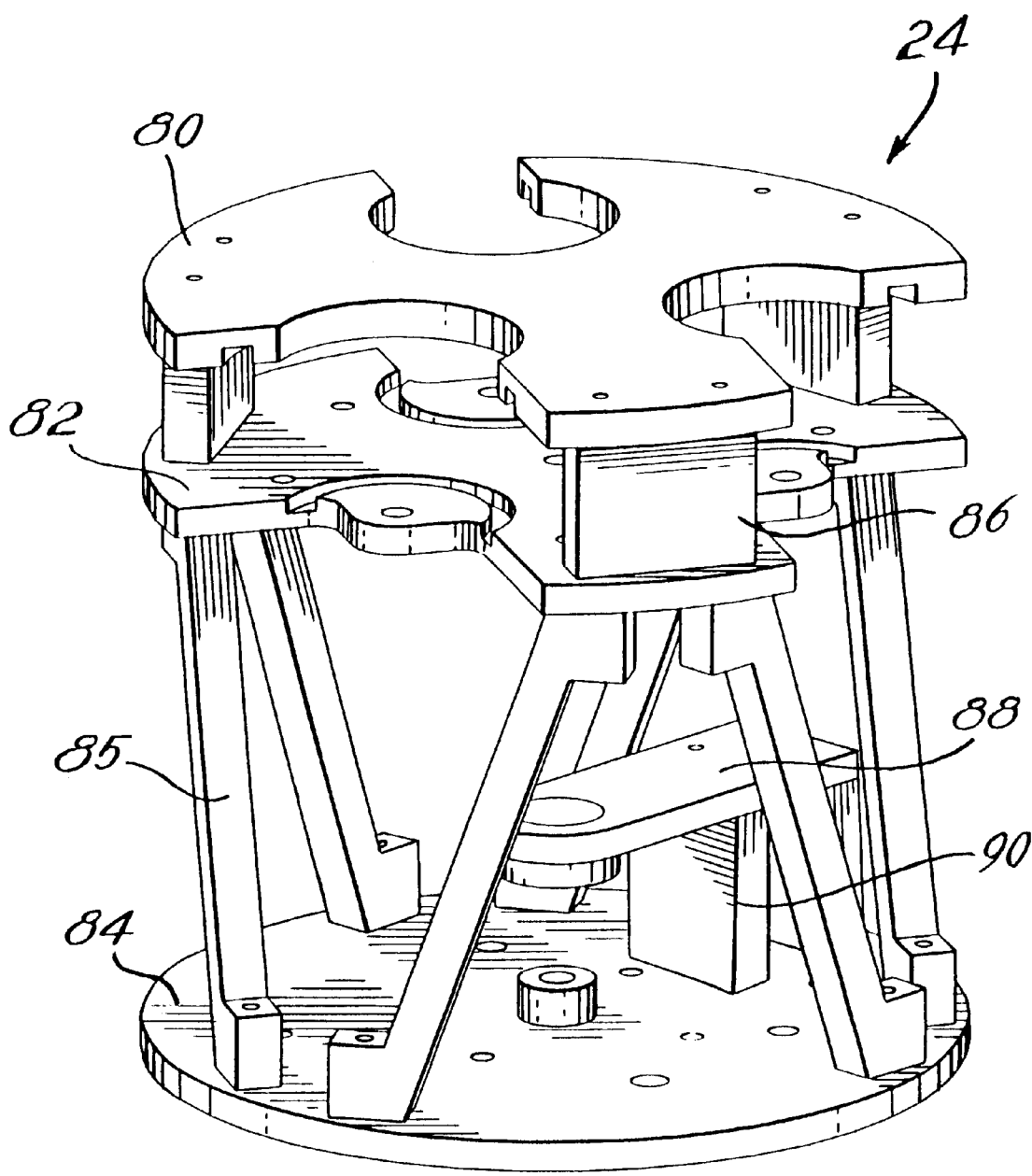
Figure 4:
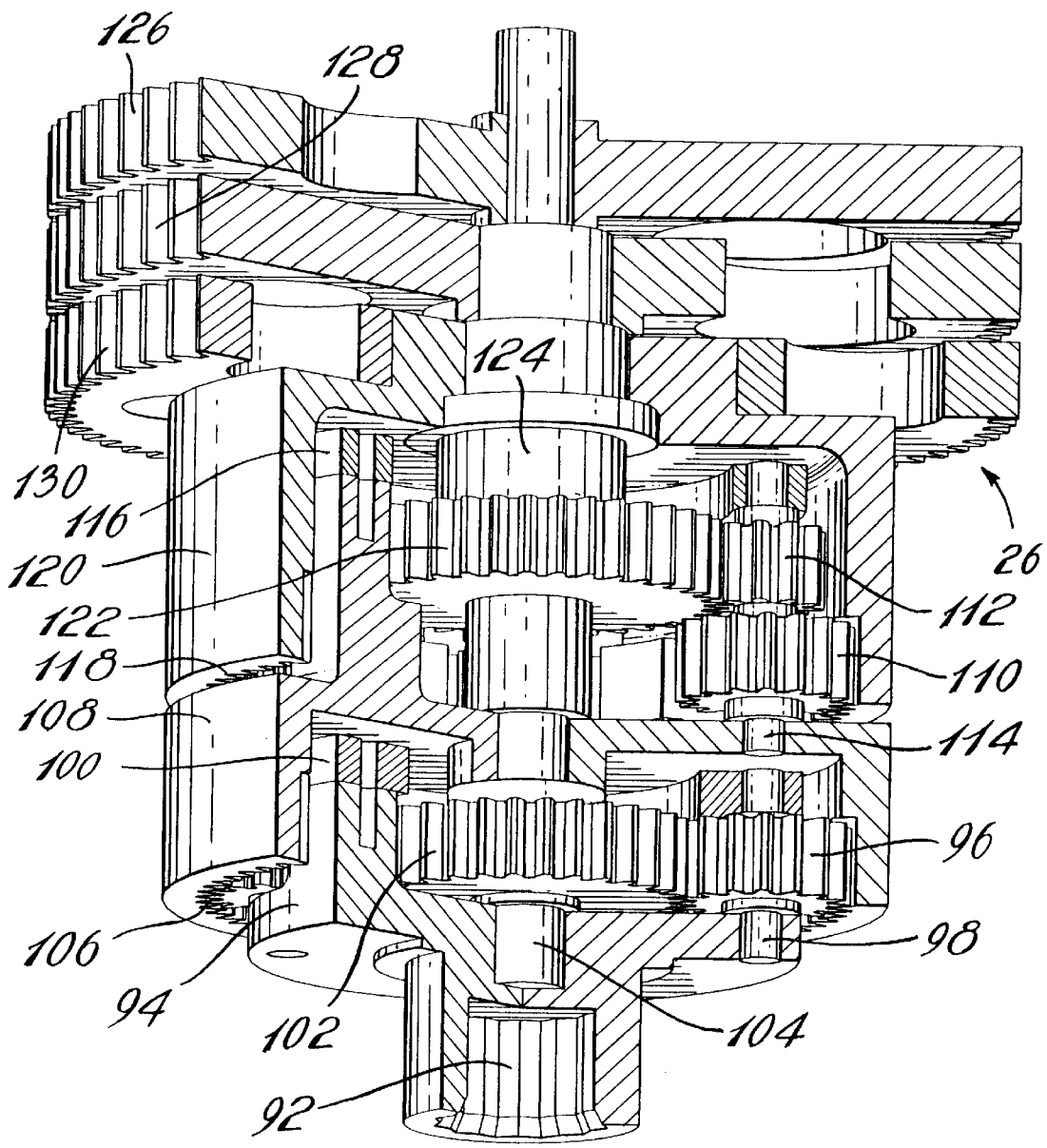
Figure 5:
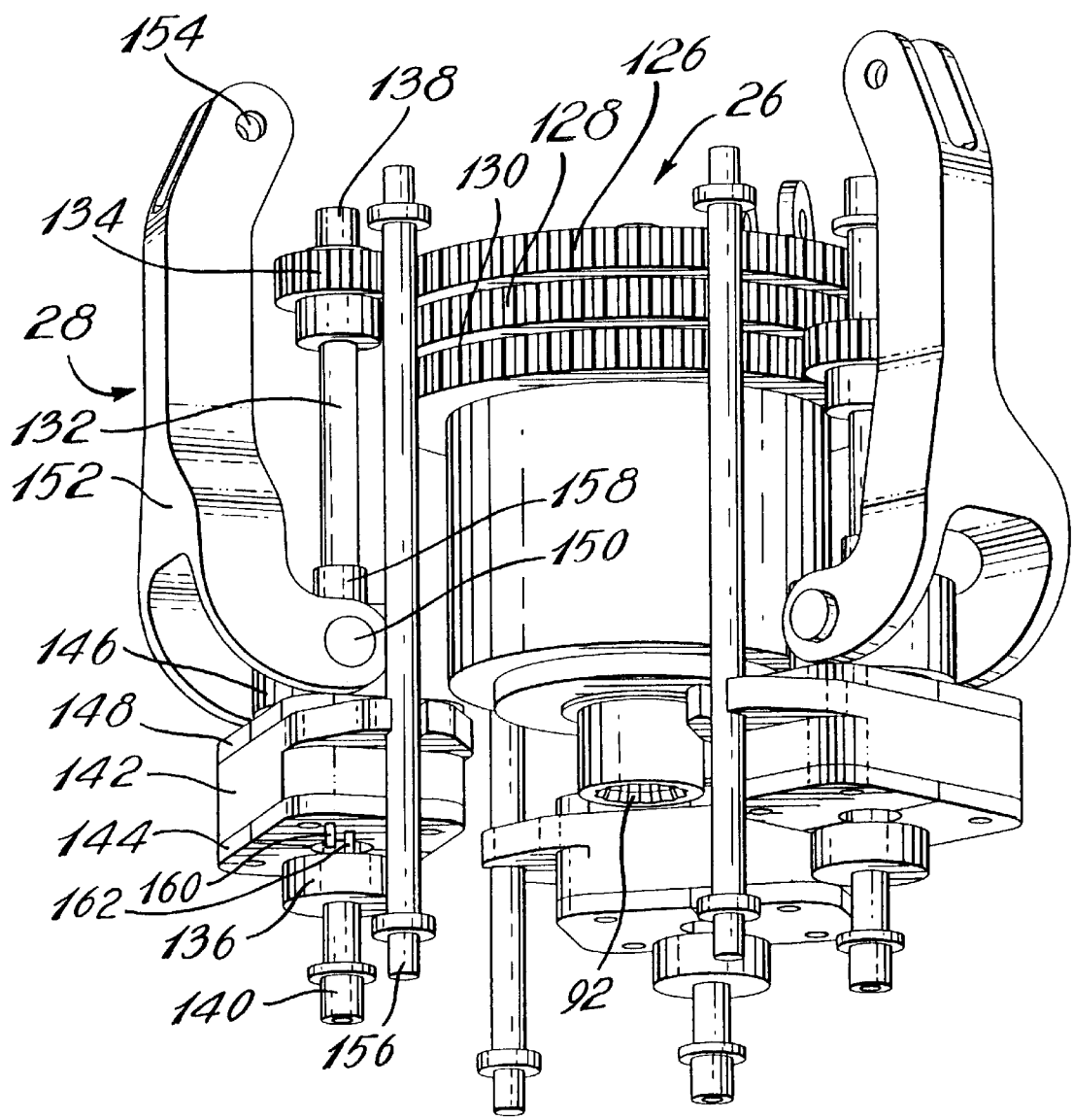
Figure 6:
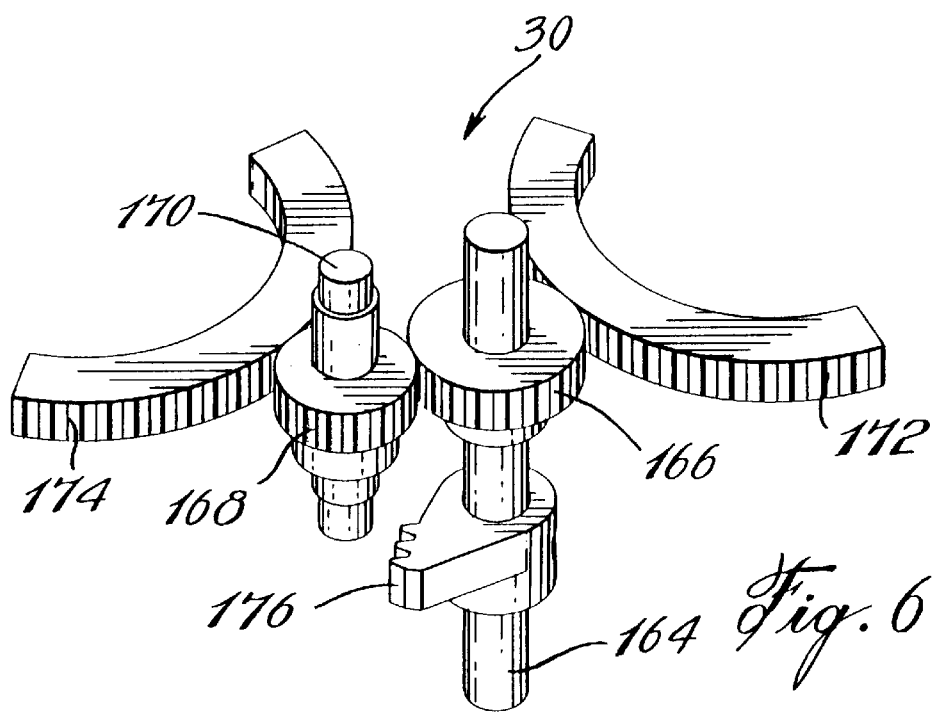
Figure 7:
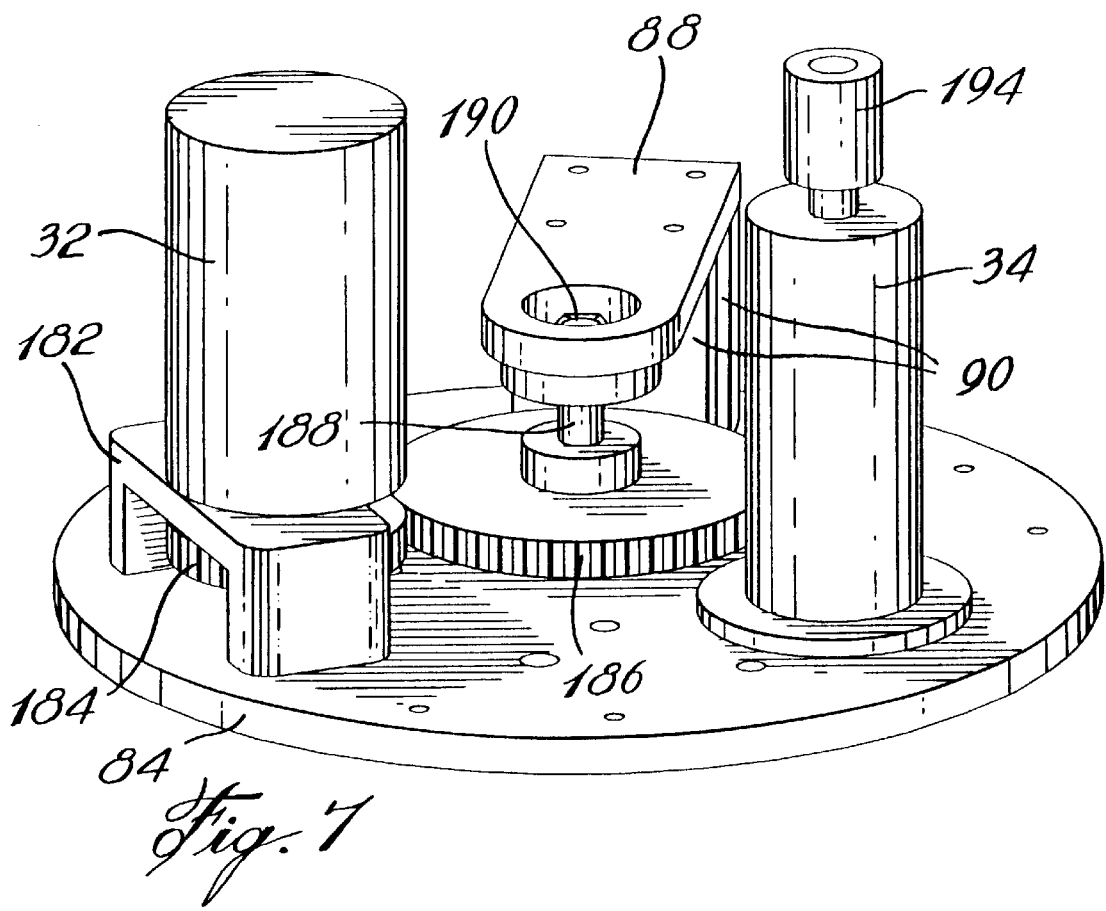
Figure 8:
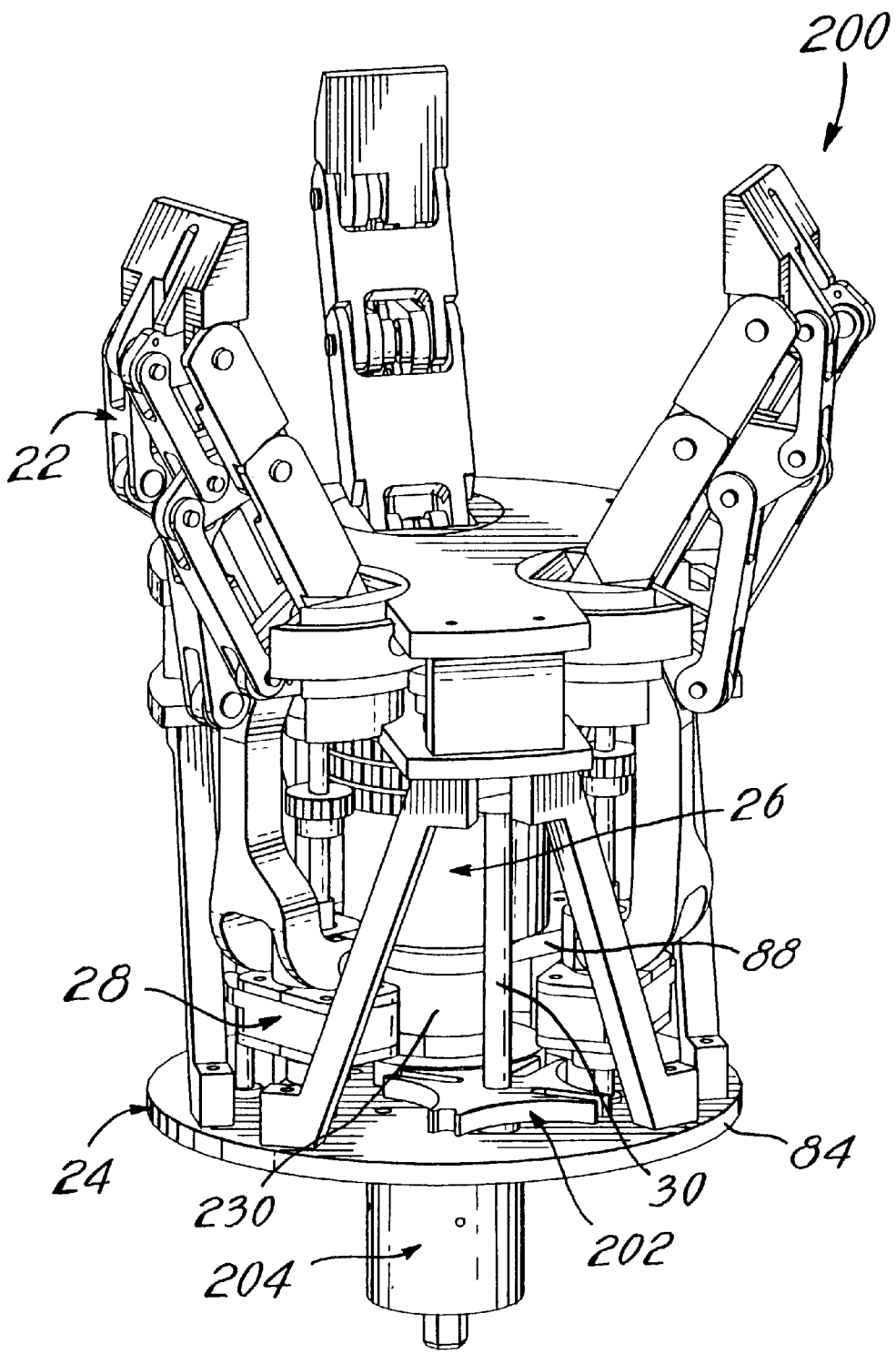
Figure 9:
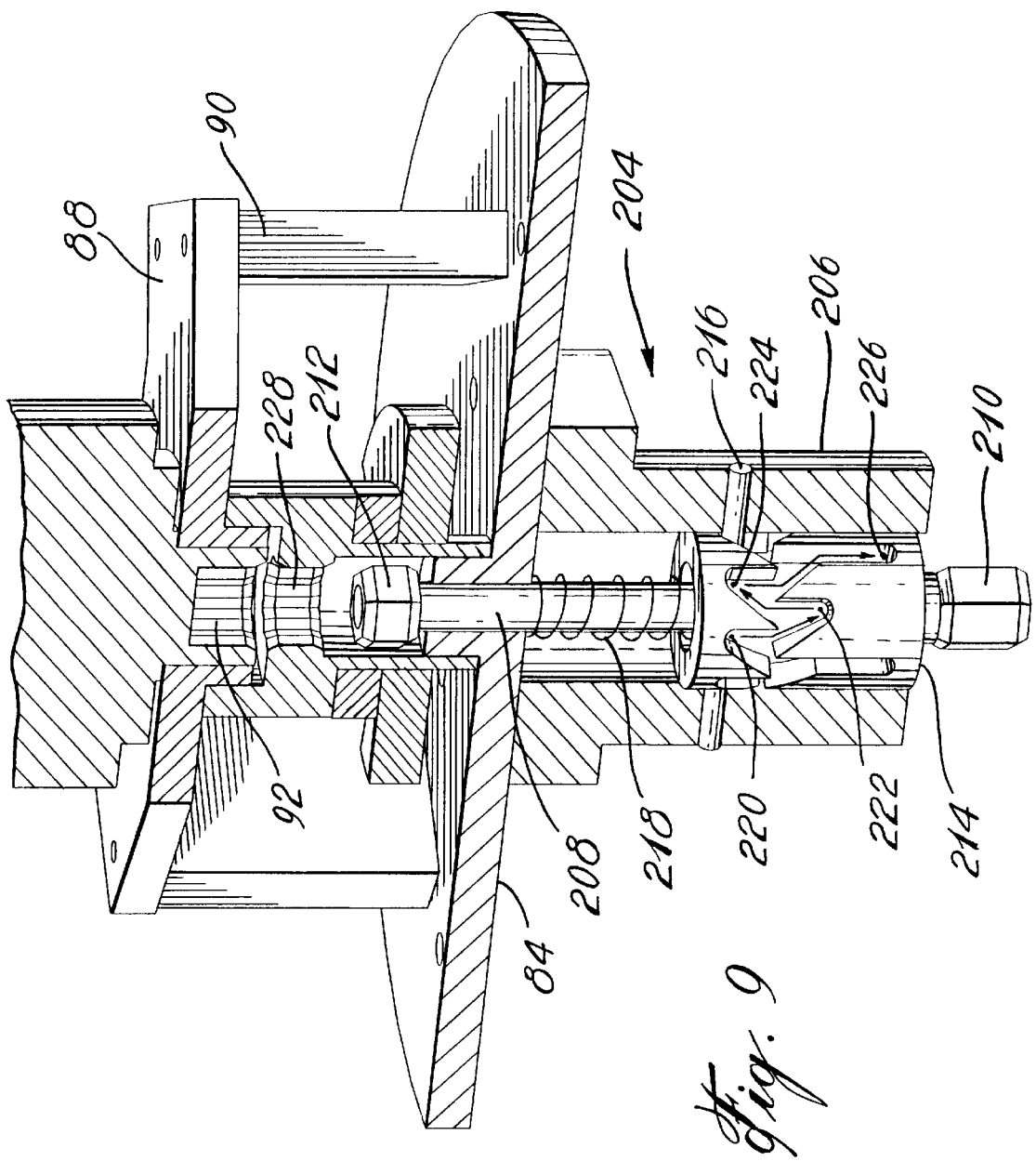
Figure 10:
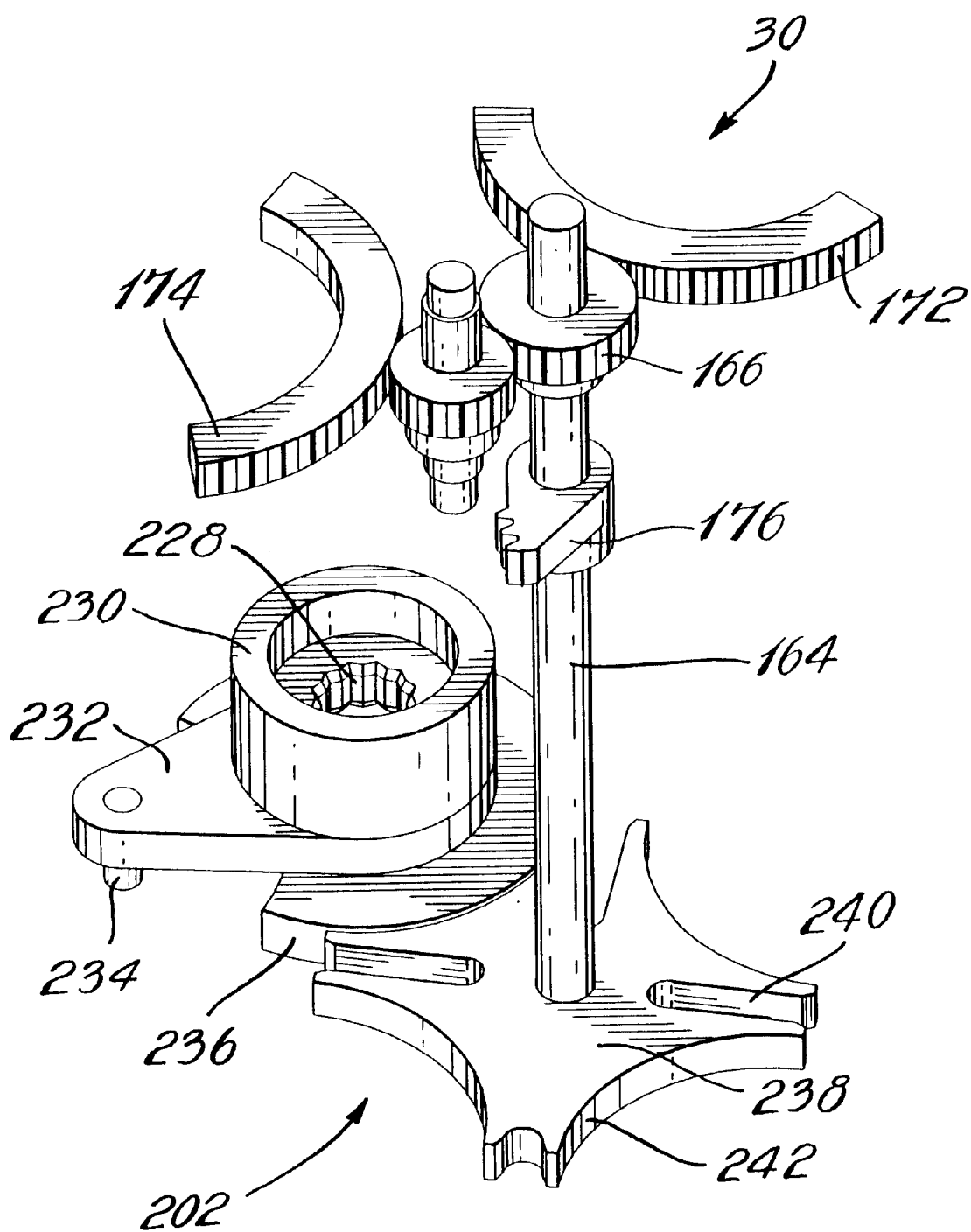
Figure 11:
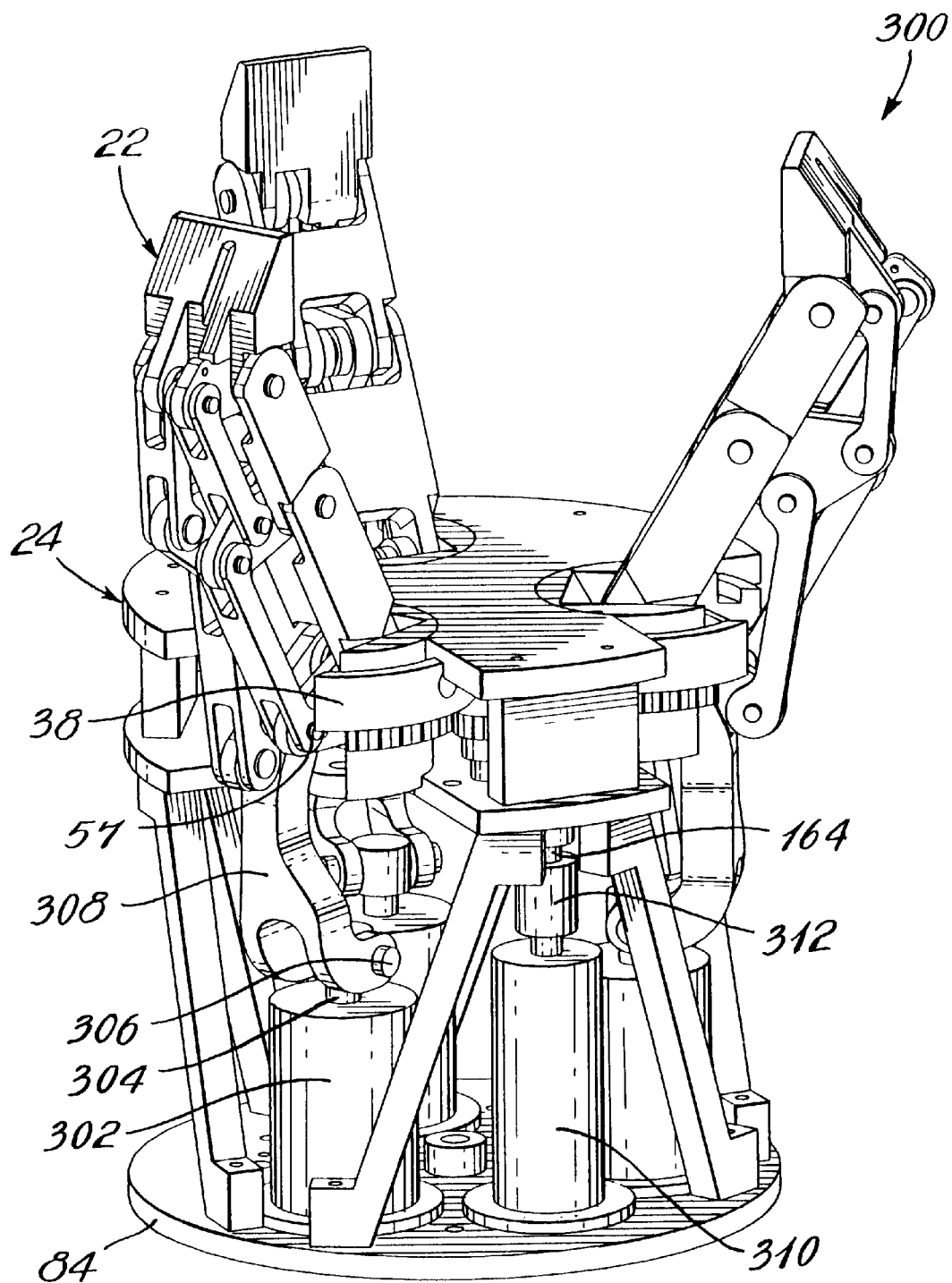
Figure 12:
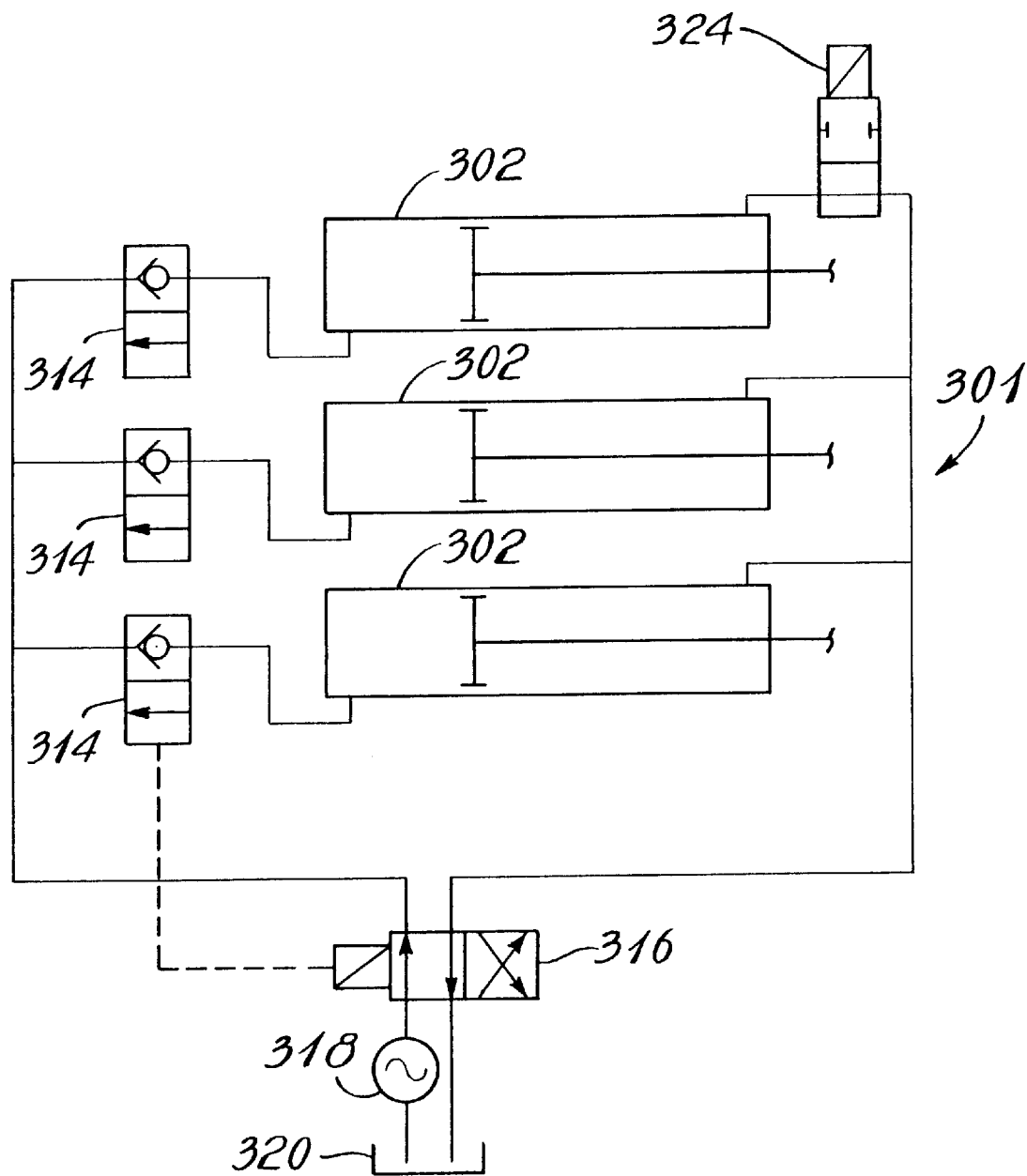

Having thus described the general nature of the present invention, reference will now be made to the preferred embodiments of the invention by way of examples and the accompanying drawings, in which:

FIG. 1 is a perspective view of a gripping mechanism incorporating a preferred embodiment of the invention which includes actuators;

FIG. 2 is a perspective view of an underactuated three degrees of freedom finger which is used in all embodiments of the invention;

FIG. 3 is a perspective view of a frame of the gripping mechanism used in the embodiment in FIG. 1;

FIG. 4 is a partially sectional perspective view of a one-input/three-output planetary gearing differential used in the embodiment in FIG. 1 for driving the fingers in pen/close actions;

FIG. 5 is a perspective view of transmission screws and the differential, each of the transmission screws transmitting the output rotation from the differential to translation of a driving bar to actuate the finger;

FIG. 6 is a perspective view of the orientation mechanism used in the embodiment in FIG. 1;

FIG. 7 is a perspective view of two actuators mounted on the frame, showing the motorization for the opening/closing and orientation of the fingers, which is used in the embodiment in FIG. 1;

FIG. 8 is a perspective view of the gripping mechanism incorporating another embodiment of the invention, which is a passive tool without actuators;

FIG. 9 is a partially sectional perspective view of the embodiment in FIG. 8 showing a switching mechanism used for selectively coupling the passive tool with an external driving apparatus;

FIG. 10 is a perspective view of a Geneva mechanism connected to the orienting mechanism and used in the embodiment in FIG. 8;

FIG. 11 is a perspective view of the gripping mechanism incorporating a third embodiment of the invention, in which the gripping mechanism is actuated by fluid power; and FIG. 12 is a diagram of a hydraulic circuit of a one-input/three-output differential system used in the embodiment in FIG. 11.

DETAILED DESCRIPTION OF THE PREFERRED EMBODIMENT

The gripping mechanism according to a preferred embodiment shown in FIG. 1 is generally indicated by reference numeral 20. The gripping mechanism 20 is a self-adaptive mechanical hand with ten degrees of freedom, which requires only two actuators. This flexible and versatile mechanical hand allows the stable grasping of a wide variety of objects while specifying only two co-ordinates: the force or position of the closing of the fingers and the orientation of the fingers.

The gripping mechanism 20 includes three underactuated fingers 22, each having three degrees of freedom. Underactuation means that the number of actuators required is smaller than the number of the degrees of freedom. The fingers 22 can perform power as well as precision grasps. When performing a power grasp, all the surfaces of the fingers are involved and the fingers will progressively envelope the object to be grasped and eventually reach a static equilibrium. When performing precision grasp, only the tip of the fingers are used and a mechanism is added to keep the last phalanges 46 parallel to each other. The fingers 22 can be oriented to adapt to the general geometry of the objects. In this preferred embodiment, two of the fingers 22 can be rotated in synchronization up to 90 degrees in opposition relating to the general shape of the object. The main orientations of the orientatable finger 22 are as follow:

Zero degrees in which the two rotatable fingers in parallel orientation, facing the orientation fixed finger for grasping a cylindrical object;

Thirty degrees in which the fingers are adapted for grasping an elliptical object;

Sixty degrees in which the three fingers are oriented toward the center of the gripping mechanism for grasping a spherical object; and Ninety degrees in which the two rotatable fingers are oriented to face each other for grasping a planar object.

The gripping mechanism 20 also includes a frame 24, a one-input/three output differential 26, three transmission screws 28, an orienting mechanism 30 and actuators 32 and 34. These main parts will be described in detail below.

The underactuated fingers 22 are shown in FIG. 2 and, as described Applicant's U.S. Pat. No. 5,762,390. The finger 22 includes three phalanges. The first proximal phalanx 36 is connected to the base 38 through the proximal revolute joint 40. The second median phalanx 42 is connected to the proximal phalanx 36 through the median revolute joint 44. The third distal phalanx 46 is connected to the median phalanx 42 through the distal revolute joint 48.

Mechanical stoppers are provided for the respective phalanges to prevent the excessive hypertension of the finger.

In order to ensure the grasping of the objects of different shapes and sizes, springs 50, 52 and 54 are used to keep the finger in extension when no object is in contact with the phalanx. Spring 52 tends to maintain the median joint 44 in extension. Spring 50 and 54, which are working in series, tend to maintain the distal joint 48 in extension. It is pointed out that the actuator has to overcome the force of the springs. The relative stiffness of the springs must be selected in order to obtain the desired closing sequence of the fingers. In the present case, the effective stiffness of the spring 52 must be smaller than the effective stiffness of the springs 50 and 54.

The motion is transmitted to the finger 22 by the main actuator coupler link 56, which is presented by an arrow in FIG. 2, to the first proximal driving link 58 through a joint 57. The proximal driving link 58 then transmits the force to the first proximal coupler link 60 through a joint 59.

The proximal coupler link 60 transmits the force to the second median driving in 62 through a joint 61. The median driving link 62 then transmits the forces to the proximal and median phalanges 36 and 42 and to the second median coupler in 64 through a joint 63. The median coupler link 64 transmits the forces to the distal phalanx 46 through a joint 65. The distal phalanx 46 partially transmits the forces to the median phalanx 42.

The dimensions of the links, the configuration of the fingers and the position of the contact points will determine the distribution of the forces between the phalanges. With appropriate link lengths, the finger will envelope the object while exerting well distributed grasping forces which will tend to push the object towards a palm 80 (see FIG. 1) and opposing fingers.

When contact between the finger and the object occurs only on the distal phalanx 46, it is important to maintain the distal phalanx of the opposing fingers parallel to one another, in order to ensure a more stable grasp.

A parallel return mechanism includes two parallelogram, four-bar linkages which maintain the third distal phalanx 46 orthogonal to the base one of the finger in the case of a pinch grasp. The mechanism can be described in detail as follows. A first return link 66 is connected to the finger through the proximal revolute joint 40 an is lying on a mechanical stopper 68 which is mounted on the base 38 of the finger. A first return coupler link 70 connects the link 66 to a second median return link 2 through two joints 69 and 71. Together with the proximal phalanx 36, these links define a parallelogram four-bar linkage. The median phalanx 42, the median parallel link 72, a parallel distal link 76 and the parallel return second median coupler link 74 define the second parallelogram four-bar mechanism. The parallel links 72, 74 and 76 are connected through joints 73 and 75. The return parallel distal abutment link 76 is lying on a mechanical stopper attached to the distal phalanx 46. The springs are used to constrain the links which are lying on mechanical stoppers in order to ensure contact at the stoppers when no object is present.

When no object is contacted or when a parallel pinch grasp is being performed, the distal phalanx 46 is maintained orthogonal to the palm 80 of the gripping mechanism by the parallelogram four-bar linkages, which remain in contact with the mechanical stoppers.

If an enveloping grasp is performed, the parallelogram four-bar linkages will be taken away from the mechanical stoppers, thereby allowing the desired enveloping motion. The parallelogram four-bar linkages do not effect the underactuated enveloping grasps.

The frame 24 is illustrated in FIG. 3, which includes three plates connected by links. The upper plate 80, which defines the palm, of the gripping mechanism 20 is linked to a midplate 82 by three blocks 86 oriented normal to the radial direction and placed on the vertices of an equilateral triangle. With this configuration, the frame is constrained and the blocks 86 mainly work with forces lying in the main plane. Additional blocks (not shown) can be added to increase the stiffness of the frame 24. The midplate 82 is linked to a bottom plate 84 by six bars 85 placed is the legs of a Gough-Stewart platform. With this configuration, the frame 24 is properly constrained and the bars 85 mainly work in tension compression. These three plates 80, 82 and 84 give two main levels. The first level between the plate 80 and 82 holds the base 38 of each finger 22. The second level between plates 82 and 84 holds transmission mechanisms (see FIG. 1). An additional plate 88 is attached to the bottom plate 84 by two blocks 90, the use of which will be explained hereinafter.

The structural details of each plate is shown in FIG. 3 and will be understood by those skilled in the art when the structures of other parts to be mounted to the frame 24 are described below.

The one-input/three-output differential 26 for close/open transmission refers to FIG. 4. In addition to the underactuation in each finger 22, underactuation between the fingers is performed with the help of the one-input/three-output differential 26. The differential 26 is pivotally attached between the plates 82 and 88 of the frame 24. A carrier 94 is pivotally connected to plate 88 of the frame 24. A shaft 104 is pivotally connected to the carrier 94 and the plate 82 of the frame 24. A carrier 108 is pivotally connected to the shaft 104. A shaft 124 is also pivotally connected to the shaft 104. A shaft 120 is pivotally connected to the shaft 124. The input is the carrier 94 driven via its socket 92 by a male connector 190 which is shown in FIG. 7. The differential 26 comprises two planetary gear trains. The first planetary gear train has the carrier 94 as input. A plate 100 is attached to the carrier 94. Two or more planet gears 96 are pivotally attached to the carrier 94 and plate 100 by their shafts 98, which are free to rotate in the holes of a carrier 94 and plate 100. The power of the carrier 94 is transmitted to a sun gear 102 and an internal gear 106 via the planet gears 96. The sun gear 102 is attached to the shaft 104. The internal gear 106 is attached to the carrier 108, which is the input of the second planetary gear train. In the second planetary gear train, a plate 116 is attached to the carrier 108. One or more sets of planet gears 110 and 112 are pivotally attached to carrier 108 and the plate 116 via there shafts 114 which are free to rotate in the holes of the carrier 108 and the plate 116. The planet gears 110 and 112 are attached to the shafts 114 and rotate together therewith. The power of the carrier 108 is transmitted to a sun gear 122 via the planet gear 112. The power of the carrier 108 is also transmitted to the internal gear 118 via the planet gear 110. The sun gear 122 is attached to the shaft 124. An internal gear 118 is attached to the shaft 120. The output gear 126 is attached to the shaft 104. The output gear 128 is attached to the shaft 124. The output gear 130 is attached to the shaft 120.

To ensure that all fingers move together when under no load, friction may be provided between the planet gears and their mountings.

In order to obtain proper distribution of the power, the three output gears 126, 128 and 130 should have the same or close to the same output torque. In the first planet gear train, the sun gear 102 takes ⅓ of the input torque and the internal gear 106 takes ⅔ of the input torque. The torque in the internal gear 106, is the input of the second planetary gear train. In the second planetary gear train, the sun gear 122 takes ½ of the input torque and the internal gear 118 takes ½ of the input torque.

Therefore, the output torque of the gear 126 is ⅓ of the input torque. The output torque of the gear 128 is ⅔×½ of the input torque, therefore, ⅓. The output torque of the gear 130 is ⅔×½ of the input torque, therefore, ⅓.

These torque ratios are obtained by the proper ratio of the number of teeth. For the first planetary gear train, the number of teeth of the sun gear 102 is ½ of the number of teeth of the internal gear 106. The number of teeth of the planet gears 96 are ¼ of the number of teeth of the sun gear 102. For the second planetary gear train, there are two planet gears 110 and 112, the planet gear 112 transmitting its power to the sun gear 122 and the planet gear 110 transmitting its power to the internal gear 118. To obtain equal torque on the sun gear 122 and the internal gear 118, the ratio of the number of teeth of sun gear 122 over the number of teeth of a planet gear 112, must be equal to the ratio of the number of teeth of internal gear 118 over the number of teeth of a planet gear 110. The three general output gears 126, 128 and 130 are of equal size and transmit their power to the gears 134 of transmission screws shown in FIG. 5, which is also of equal size.

In FIG. 5, the three outputs from gear 126, 128 and 130 of the differential 26 are transmitted to the fingers through the three transmission screws 28. The transmission screw 28 is built around a main shaft 132. The main shaft 32 is pivotally supported by end bushings 138 and 140. These bushings 138 and 140 are inserted in the plates 82 and 84 of the frame respectively. The output torque of the differential 26 is transmitted to the main shafts 132 through gears 134, respectively. The rotation of the main shaft 132 is transmitted, using a screw 158, to translation of a nut which is not shown and is attached to a nut frame 142 by plates 144. To avoid rotation of the nut frame 142, a groove in the nut frame 142 slides along a guiding bar 156. This guiding bar 156 is attached at its ends to the plates 82 and 84 of the frame 24. The translation of the nut frame 142 is transmitted to the rotatable plate 146 which is pivotally attached to the nut frame 142 by plates 148. The rotatable part 146 is free to rotate relative to the nut frame 142 to allow the orientation of the fingers. This makes the translation of the nut frame 142 independent from the orientation of the fingers. The translation of the rotatable part 146 is transmitted to the actuation bar 152 by a pin 150 then, the translation of the bar 152 is transmitted to the finger 22 by the joint 57 (see FIG. 2) which is pivotally received in a hole 154 in the bar 152.

In order to synchronize the closing of the fingers, the fingers are opened until they all reach their maximum opening limit. This limit is implemented by the contact of screws 160 and 162, respectively attached to the nut frame 142 and the support 136. The support 136 is attached to the main shaft 132. The maximum opening limit stops the rotation of the screw 158 and not the translation of the nut box 142 to avoid jamming.

In a simplified embodiment, the nut frame 142 is directly attached to the actuation bar 152 and is not guided by the guiding bar 156. The nut frame 142 is then guide in rotation by the actuation bar 152, which follows the orientation of the finger 22. Fewer parts are necessary for this simplified implementation, but the translation of the nut frame 142, therefore, the closing of the fingers is not independent from the orientation of the fingers 22. Also, the torque is supported by the fingers which includes larger stresses.

The power transmitted through the transmission screw 28 is one-way only, which is from the rotation of the main shaft 132 to the translation of the nut frame 142 and is not reversible. Therefore, the transmission screw 28 advantageously provides a self-locking feature so that each finger is locked in their position in an close/open action when the power for such an action is off.

The orientation of the base 38 of the fingers 22 is coupled. As shown in FIG. 6, two of the fingers are rotated with synchronization from one input with the help of a gearing mechanism. Finger gears 172 and 174, of the same size, are attached to each of the rotating basis 38 (see FIG. 2). An input gear 166, attached to an orientation shaft 164 directly drives the first finger gear 172. A free gear 168, attached to the free shaft 170, is driven by the input gear 166 and transmits its motion to the second finger gear 174. This arrangement allows the two-finger basis 38 to rotate in opposite directions. For compatibility with another specific embodiment which will be described below, the ratio between either one of the finger gears 172 and 174 and the input gear 166 is three to one.

In one of the orientations in which two of the fingers face each other, the third finger is not useful for the grasping and could even potentially disturb the grasp. Therefore, it is stopped in its open position by a stopping mechanism 176 attached to the orientation shaft 164. This mechanism includes a rack that engages the output gear 126 of the differential 26 only for the specific configuration in which two finger face each other. The connection between shaft 164 and the rack member 176 is resilient within limits to allow for the rack teeth to engage the teeth of gear 126 even if initially misaligned.

The opening/closing of the fingers and the orientation of the fingers are driven by two independent actuators which are shown in FIG. 7. The first actuator 32, attached to the plate 84 by a support member 182, drives the one-input/three-output differential 26 via gearing. In more detail, the first actuator 32 drives the shaft 188 via the gear 184, attached on the shaft of the actuator 32 and the gear 186, attached to the shaft 188. The shaft 188 is pivotally attached to the plate 84 and drives the one-input/three-output differential 26 (see FIG. 1) via a male connector 190 which is attached to the shaft 188 and engages the socket 92 of the differential 26. The second actuator 34 is attached to the plate 84. The actuator 34 drives the orientation shaft 164 (see FIG. 6) via the coupling 194.

In another preferred embodiment as shown in FIGS. 8 and 9, the gripping mechanism is a passive tool 200 and is adapted to be attached and actuated by an external apparatus. This apparatus can rotate and advance a socket that operates the gripping mechanism. Therefore, the two motors and the mechanism that drive the differential 26 and the orientation transmission 30 are replaced by an interface, which comprise a switching mechanism 204 and a Geneva mechanism 202.

The external driving apparatus generally includes a socket that is able to rotate and advance. Therefore, two degrees of actuation are available. The rotation of the socket can provide a large torque and power, and can rotate in both directions. The advance of the socket provides a smaller force, it has only two positions and it is compliant.

In FIG. 9, the opening/closing of the fingers and the orientation of the fingers are performed by the socket torque. The switching of the power of the socket torque from the open orientation and vice versa is performed by the socket advance with the help of an indexing mechanism. The power of the socket torque is transmitted to a shaft 208 via a male connector 210 which engages the socket of the external driving apparatus (not shown). The power of the shaft 208 is transmitted to the socket 92 or the socket 228 through a male connector 212. The shaft 208 is free to rotate and translate in the hole of the plate 84. An indexing ring 214 is free to rotate but fixed in translation on the shaft 208. Indexing pins 216 are attached to a housing 206 of the switching mechanism 204 and are inserted in the grooves of the indexing ring 214. A compression spring 218 is inserted on the shaft 208, between the plate 84 and a shoulder (not shown) on the shaft 208. The indexing mechanism works as follows. The compression spring 218 pushes to keep the shaft 208 towards the bottom position in which the indexing ring 214 is also towards the bottom position, and the in exiting pins 216, are inserted in the grooves of the indexing ring 214 at positions 220. The motion of the indexing ring 214 is guided by the indexing pins 216 via the grooves in the indexing ring 214. When the driving apparatus socket pushes on the shaft 208 via the male connector 210, the shaft 208 advances against spring 218. This advance is stopped by the indexing pins 216 that are at position 222 in the grooves of the indexing ring 214. At position 222, the male connector 212 is inserted in socket 228. Then, if the driving apparatus socket torque is activated, the Geneva mechanism 202, therefore, the orienting mechanism 30 (see FIG. 8) will be activated. If the driving apparatus socket releases its pushing action, the spring 218 will push the shaft 208 towards the bottom position until the indexing pins 216 are at position 224 in the grooves of the indexing ring 214. If the driving apparatus socket pushes again on the shaft 208 via the male connector 210, the shaft 208 advances against spring 218. This advance is stopped by the indexing pins 216 that are at position 226 in the grooves of the indexing ring 214. At position 226, the male connector 212 is inserted in the socket 92. Then, if the driving apparatus socket torque is activated, the opening and closing mechanism which is the differential 26 is activated. If the driving apparatus socket releases its pushing action, the spring 218 will push the shaft 208 towards its bottom position until the indexing pins 216 are at position 220 in the grooves of the indexing ring to close the cycle. To switch between the two tasks, this cycle is infinitely repeated. The sockets 92 and 228 and the male connector 212 are machined for easy insertion.

A Geneva mechanism 202, as shown in FIG. 10, is used to drive the orientation shaft 164 in order to obtain predetermined self-locked orientations. The shaft 230, the driver 232, the pin 234 and the locking disc 236 are attached to form the input portion. The shaft 230 is pivotally attached by its ends to the plate 84 and 88 (see FIG. 8). The input is provided via the socket 228 of the shaft 230. When the Geneva mechanism 202 is in a moving phase, the pin 234 of the driver 232 is in one of four slots 240 of a Geneva wheel 238. During this phase, the driver 232 moves the Geneva wheel 238 by 90 degrees. When the Geneva mechanism 202 is in a dwell phase, the Geneva wheel 238 is locked by the locking disc 236, while the entire input portion of the Geneva mechanism 202 is free to rotate. During this phase, the fingers 22 are locked in their orientation.

In this preferred embodiment, the fingers are oriented in four predetermined positions, separated by thirty degrees each. Therefore, the ratio between either one of the finger gears 172 and 174 and the input gear 166 is 3:1, so that the predetermined positions of the two rotatable fingers are zero degrees, thirty degrees, 60 degrees and 90 degrees. To restrain the orientation of the fingers in these four positions, one of the slots 240 of the Geneva wheel 238 is filled to stop the rotation of the Geneva wheel 238 and the orientation shaft 164. This mechanism allows self-locking of the fingers even if they are not driven, allows positioning errors of the drive 232, and allows free motion of the driver 232 during the dwell phase, which is useful for the switching mechanism 204.

Variation may be made without changes in the features presented in this embodiment. The power of the socket torque, for example, could come from an internal motor and the socket advance and switching mechanism could be replaced by an internal solenoid. Therefore, a gripping mechanism internally powered by a main motor and a solenoid is obtained.

A further embodiment of the invention is illustrated in FIG. 11, in which, a gripping mechanism 300 is actuated by fluid power which is hydraulic or pneumatic, and the implementation of the underactuation is also performed by fluid power. For the opening and closing of the fingers 22, three piston cylinders 302 are attached to the plate 842. They are placed in order to have their main axis aligned with the axis of rotation of the base 38 of the fingers 22, allowing free rotation of the fingers 22. When the piston cylinders 302 are powered, a rod 304 is moved. This motion is transmitted to the actuation bar 308 via the pin 306. Then, this motion is further transmitted from the actuation bar 308 to the fingers 22 via the pin 57. To orient the fingers 22, a rotational fluid actuator 310 activates the orientation shaft 164 via a coupling 32.

The underactuation between the fingers 22 is performed by a fluid power system 301 instead of the gearing differential 26 in other embodiments. The fluid power ystem 301 is illustrated in FIG. 12, which is partitioned in three outputs to drive the respective three piston cylinders 302 in either direction, which emulates the one-input/three-output differential 26 used in the other embodiments. In order to emulate the self-locking feature of each of the transmission screws 28 in FIG. 1, a two position check valve 314 is added to each branch connected to the piston cylinders 302. The two position check valves 314 are associated with a two position switching valve 316, which switches the pressurized fluid supplied from a fluid pump 318 to the piston cylinders 302 to change the direction of the motion, so that the check valve 314 are inactivated only when the power to open the fingers is on. The fluid pump 318 is connected to a tank 320.

As an alternative to a mechanical blocking mechanism, a two position solenoid switch valve 324 is connected to one of the piston cylinders 302 which is to actuate the orientation fixed finger. The solenoid valve 324 is controlled by a switch connected to the orientation shaft 164 so that the solenoid valve 324 is activated to shut off the fluid supply only when the two rotatable fingers are oriented to face each other.

The requirement of equal power outputs from a differential to drive the opening and closing of the respective fingers is easier to be achieved with the fluid power system 301 than with the mechanical gearing differential 26. The fluid pressure in each piston cylinder 302 is generally maintained equal and, therefore, the same-size piston cylinders will ensure the equal power outputs.

Changes and modifications to the above described embodiments of the invention may be made without departing from the spirit or scope of the invention, which are intended to be limited solely by the scope of the appended claims.

We claim:

1. An actuation system for a gripping mechanism underactuated between at least three fingers at least two of which are rotatable for orientation, each finger having a finger actuation mechanism to actuate the finger between first and second limit positions in a selective gripping action, the actuation system comprising:
    a differential mechanism operatively connected to the respective finger actuation mechanisms for receiving one power input and transmitting the one power input into a plurality of power outputs to actuate the respective fingers in a close/open action;
    a stopping mechanism to controllably prevent motion of at least a third one of the fingers in the close/open action before said at least third one of the fingers reaches one of said limit positions such that two other ones of the fingers can perform a grasp without said at feast third one of the fingers interfering; and
    an orienting mechanism operatively connected to the respective rotatable fingers for receiving one rotation input and transmitting the one input into at least two rotation outputs to rotate the respective at least two rotatable fingers in a finger orientation.

2. An actuation system as claimed in claim 1 wherein the stopping mechanism is responsive to a rotational position of the orienting mechanism to stop the close/open action of said at least third one of the fingers.

3. An actuation system as claimed in claim 2 wherein the number of the fingers is three and each of the fingers is self-locked in the closed/open action when power for actuating the closing and opening of the fingers is off, whereby said fingers can perform a three-finger grasp when the rotatable fingers are rotated to be facing towards a common center, and the third finger is stopped when the two rotatable fingers are rotated to face each other so that the rotatable fingers may perform a two finger grasps without the third finger interfering.

4. An actuation system as claimed in claim 3 wherein the two rotatable fingers are self-locked in predetermined orientations when orienting motion is not requested.

5. An actuation system as claimed in claim 3 wherein the differential mechanism comprises three fluid powered piston cylinders each connected to a driving bar member, each said driving bar member being connected to one of the respective finger actuation mechanisms, each said piston cylinder receiving pressurized fluids from one pressurized fluid source to drive the respective fingers in the close/open action through said driving bar members.

6. An actuation system as claimed in claim 5 wherein the differential mechanism comprises three check valves, each being connected between one of the piston cylinders and the pressurized fluid source, and active only when power to open the fingers is off.

7. An actuation system as claimed in claim 6 wherein the differential mechanism includes a valve connected to one of the piston cylinders which actuates the third one of the fingers to stop a fluid supply from the fluid source to said one of the piston cylinders to deactuate the closing action of the third finger when the two rotatable fingers are oriented to face each other.

8. An actuation system as claimed in claim 5 wherein each rotating axis of the two rotatable fingers is aligned with a main axis of a corresponding piston cylinder.

9. An actuation system as claimed in claim 3 comprising a rotation fluid actuator connected to the orienting mechanism to drive the two rotatable fingers in the orientation motion.

10. An actuation system as claimed in claim 2 comprising a frame including a palm defining a palm plane of the gripping mechanism, each of the three fingers being mounted to the frame and the two thereof being rotatable about an axis orthogonal to the palm plane.

11. An actuation system as claimed in claim 10 wherein the differential mechanism is mounted to the frame and comprises a plurality of planetary gear trains to transmit one torque input into three equal torque outputs.

12. An actuation system as claimed in claim 11 wherein the differential mechanism comprises three rotation/translation transmission means for transmitting the respective outputs in rotation from the differential mechanism to a translation of three driving bar members which are connected to the respective finger actuation mechanism to drive the fingers in the close/open action.

13. An actuation system as claimed in claim 12 wherein the orienting mechanism comprises a self-lock Geneva mechanism for rotating the two rotatable fingers to predetermined orientations.

14. An actuation system as claimed in claim 13 further comprising a fastening interface operatively mounted to the frame and adapted to receive an external power input to the actuation system to transmit the power input selectively to the differential mechanism or the orienting mechanism.

15. An actuation system as claimed in claim 13 further comprising an actuator and a switching mechanism, both being mounted to the frame, the switching mechanism being connected to the actuator, and selectively connecting the differential mechanism or the orienting means for selective power input.

16. An actuation system as claimed in claim 12 further comprising a first motor and a second motor mounted to the frame, the first motor being operatively connected to the differential mechanism to drive the respective fingers in the close/open action, and the second motor being operatively connected to the orienting mechanism to drive the at least two rotatable fingers in the orientation motion.

17. An actuation system as claimed in claim 2, wherein the stopping mechanism controllably prevents motion of said at least third one of the fingers in the close/open action only when said two other ones of the fingers are oriented to face each other, whereby said fingers can perform an all finger grasp when the rotatable fingers do not face each other.

18. An actuation system as claimed in claim 2, wherein the orienting mechanism moves the stopping mechanism into a stopping engagement with said at least third one of the fingers to prevent motion of said at least third one of the fingers before said at least third one of the fingers reaches one of said limit positions.

19. An actuation system as claimed in claim 1, further comprising an actuator and a switching mechanism, the switching mechanism being connected to the actuator, and selectively connecting the differential mechanism or the orienting means for elective power input.

20. An actuation system as claimed in claim 1, wherein the differential mechanism transmits the one power input into at least three independent power outputs to actuate the respective fingers in the close/open action.

21. An actuation system as claimed in claim 20 wherein the number of the plurality of fingers is three and the one power input is transmitted into three independent inputs such that a blocking of at least one of the fingers does not stop the close/open action of the other ones of the fingers.

22. An actuation system as claimed in claim 1, wherein the number of fingers is three, said two other ones of the fingers are said at least two rotatable fingers, and said orienting mechanism causes said two other fingers to rotate in opposite directions when receiving the one rotation input, such that said three fingers can be oriented to perform any one of a two-finger grasp when said at least third one of the fingers is stopped and a three-finger grasp.

23. An actuation system for a gripping mechanism underactuated between at least three fingers at least two of which are rotatable for orientation, each finger having a finger actuation mechanism to actuate the finger in a selective gripping action, the actuation system comprising:
  a differential mechanism operatively connected to the respective finger actuation mechanisms for receiving one power input and transmitting the one power input into at least three independent power outputs to actuate the respective fingers in a close/open action; and
  an orienting mechanism operatively connected to the respective rotatable fingers for receiving one rotation input and transmitting the one input into at least two rotation outputs to rotate the respective at least two rotatable fingers in a finger orientation.

24. An actuation system as claimed in claim 23 wherein the number of the plurality of fingers is three and the one power input is transmitted into three independent inputs such that a blocking of at least one of the fingers does not stop the close/open action of the other ones of the fingers.

25. An actuation system as claimed in claim 23 wherein a stopping mechanism to deactivate at least a third one of the fingers in the close/open action when desired.

26. An actuation system as claimed in claim 23 wherein the stopping mechanism is associated with the orienting mechanism to stop the close/open action of the third one of the fingers only when the rotatable fingers are oriented to face each other, whereby said fingers can perform an all finger grasp when the rotatable fingers are rotated to be facing in a first direction, and the third finger is stopped when the rotatable fingers are rotated to face each other so that the rotatable fingers may perform a grasp without the third finger interfering.

27. An actuation system as claimed in claim 26 wherein the number of the fingers is three and each of the fingers is self-locked in the closed/open action when power for actuating the closing and opening of the fingers is off, whereby said fingers can perform a three-finger grasp when the rotatable fingers are rotated to be facing towards a common center, and the third finger is stopped when the two rotatable fingers are rotated to face each other so that the rotatable fingers may perform a two finger grasp without the third finger interfering.

28. An actuation system as claimed in claim 27 wherein the two rotatable fingers are self-locked in predetermined orientations when orienting motion is not requested.

29. An actuation system as claimed in claim 27 wherein the differential mechanism comprises three fluid powered piston cylinders connected to the driving bar members respectively and receiving pressurized fluids from one pressurized fluid source to drive the respective fingers in the close/open action.

30. An actuation system as claimed in claim 29 wherein the differential mechanism comprises three check valves, each being connected between one of the piston cylinders and the pressurized fluid source, and active only when power to open the fingers is off.

31. An actuation system as claimed in claim 30 wherein the differential mechanism includes a valve connected to the piston cylinder which actuates the third one of the fingers to stop the fluid supply to the piston cylinder to deactivate the closing action of the third finger when the two rotatable fingers are oriented to face each other.

32. An actuation system as claimed in claim 29 wherein each rotating axis of the two rotatable fingers is aligned with a main axis of a corresponding piston cylinder.

33. An actuation system as claimed in claim 27 comprising a rotation fluid actuator connected to the orienting mechanism to drive the two rotatable fingers in the orientation motion.

34. An actuation system as claimed in claim 26 comprising a frame including a palm defining a palm plane of the gripping mechanism, each of the three fingers being mounted to the frame and the two thereof being rotatable about an axis orthogonal to the palm plane.

35. An actuation system as claimed in claim 34 wherein the differential mechanism is mounted to the frame and comprises a plurality of planetary gear trains to transmit one torque input into three equal torque outputs.

36. An actuation system as claimed in claim 35 wherein the differential mechanism comprises three rotation/translation transmission means for transmitting the respective outputs in rotation from the differential mechanism to a translation of three driving bar members which are connected to the respective finger actuation mechanisms to drive the fingers in the close/open action.

37. An actuation system as claimed in claim 36 wherein the orienting mechanism comprises a self-lock Geneva mechanism for rotating the two rotatable fingers to predetermined orientations.

38. An actuation system as claimed in claim 37 further comprising a fastening interface operatively mounted to the frame and adapted to receive an external power input to the actuation system to transmit the power input selectively to the differential mechanism or the orienting mechanism.

39. An actuation system as claimed in claim 37 further comprising an actuator and a switching mechanism, both being mounted to the frame, the switching mechanism being connected to the actuator, and selectively connecting the differential mechanism or the orienting means for selective power input.

40. An actuation system as claimed in claim 36 further comprising a first motor and a second motor mounted to the frame, the first motor being operatively connected to the differential mechanism to drive the respective fingers in the close/open action, and the second motor being operatively connected to the orienting mechanism to drive the at least two rotatable fingers in the orientation motion.

41. An actuation system as claimed in claim 23, further comprising an actuator and a switching mechanism, the switching mechanism being connected to the actuator, and selectively connecting the differential mechanism or the orienting means for selective power input.

* * * * *